(12) United States Patent
Kaul et al.

(10) Patent No.: US 11,194,838 B2
(45) Date of Patent: Dec. 7, 2021

(54) GENERATING A DATA PARTITIONING STRATEGY FOR SECURE AND EFFICIENT QUERY PROCESSING

(71) Applicant: International Business Machines Corporation, Armonk, NY (US)

(72) Inventors: Akshar Kaul, Bangalore (IN);
Gagandeep Singh, Bangalore (IN);
Manish Kesarwani, Bangalore (IN);
Krishnasuri Narayanam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 16/661,167

(22) Filed: Oct. 23, 2019

(65) Prior Publication Data

US 2021/0124764 A1     Apr. 29, 2021

(51) Int. Cl.
*G06F 16/27* (2019.01)
*G06F 16/23* (2019.01)
*G06F 16/21* (2019.01)

(52) U.S. Cl.
CPC .......... *G06F 16/278* (2019.01); *G06F 16/211* (2019.01); *G06F 16/23* (2019.01)

(58) Field of Classification Search
CPC ...... G06F 16/211; G06F 16/23; G06F 16/278; H04L 63/0428
See application file for complete search history.

(56) References Cited

U.S. PATENT DOCUMENTS

| | | | |
|---|---|---|---|
| 6,192,472 B1 | 2/2001 | Garay et al. | |
| 9,898,492 B2 | 2/2018 | Chen et al. | |
| 9,934,395 B2 * | 4/2018 | Paulovicks | ............. G06F 16/10 |
| 10,491,576 B1 * | 11/2019 | Pfannenschmidt | ... H04L 63/061 |
| 2005/0147246 A1 | 7/2005 | Agrawal et al. | |
| 2012/0331088 A1 | 12/2012 | O'Hare et al. | |
| 2013/0047230 A1 * | 2/2013 | Krishnan | ............ G06F 21/6218 726/7 |

(Continued)

OTHER PUBLICATIONS

Zheng et al., "Using Replication and Partitioning to Build Secure Distributed Systems," In Proceedings of the 2003 Symposium on Security and Privacy, pp. 236-250. IEEE (2003).

(Continued)

*Primary Examiner* — Merilyn P Nguyen
(74) *Attorney, Agent, or Firm* — Ryan, Mason & Lewis, LLP (57) ABSTRACT

Methods, systems, and computer program products for generating a data partitioning strategy for secure and efficient query processing are provided herein. A computer-implemented method includes obtaining at least (i) a database schema associated with a database and (ii) a query workload associated with the database; and generating, based at least in part on the database schema and the query workload, a distributed database structure for the database that (i) stores a first set of columns of the database within a private cloud environment in a plaintext format and (ii) stores a second set of columns of the database in a public cloud environment, wherein the second set of columns is stored in either a plaintext format or an encrypted format based on whether the second set of columns comprises sensitive data.

20 Claims, 7 Drawing Sheets

(56) References Cited

U.S. PATENT DOCUMENTS

| | | | | |
|---|---|---|---|---|
| 2013/0191650 | A1* | 7/2013 | Balakrishnan | H04L 9/008 |
| | | | | 713/190 |
| 2014/0075183 | A1* | 3/2014 | Wang | G16B 50/00 |
| | | | | 713/150 |
| 2016/0254911 | A1* | 9/2016 | Manchepalli | H04L 9/008 |
| | | | | 713/193 |
| 2017/0026355 | A1* | 1/2017 | Mathaiyan | H04L 9/3271 |
| 2017/0293534 | A1* | 10/2017 | Auvenshine | G06F 11/1464 |
| 2017/0300703 | A1* | 10/2017 | Deshpande | G06F 21/6218 |
| 2019/0114438 | A1* | 4/2019 | Hersans | H04L 9/0894 |
| 2019/0294596 | A1* | 9/2019 | Yan | G06F 11/301 |
| 2020/0184082 | A1* | 6/2020 | Fu | G06F 16/24553 |

OTHER PUBLICATIONS

Thuraisingham et al., Security Constraint Processing in a Multilevel Secure Distributed Database Management System:, IEEE Transactions on Knowledge and Data Engineering, vol. 7, No. 2, pp. 274-293 (Apr. 1995).

Oktay et al., "Secure and Efficient Query Processing over Hybrid Clouds," IEEE 33rd International Conference on Data Engineering, Apr. 19-22, 2017.

Oktay et al., "Risk-Aware Workload Distribution in Hybrid Clouds," IEEE Fifth International Conference on Cloud Computing, Jun. 24-29, 2012.

\* cited by examiner

GENERATING A DATA PARTITIONING STRATEGY FOR SECURE AND EFFICIENT QUERY PROCESSING

BACKGROUND

The present application generally relates to information technology and, more particularly, to secure data partitioning strategies.

A distributed database refers to a database where the database schema is split across different sites either on the same network or on entirely different networks. For example, a database may be vertically partitioned so that columns of a table in the database are split into different portions. These portions may be stored in multiple physical locations and processing may be distributed among multiple database nodes. In general, distributed databases provide improved query processing, reliability, availability, and scalability.

SUMMARY

In one embodiment of the present invention, techniques for generating a data partitioning strategy for secure and efficient query processing are provided. An exemplary computer-implemented method includes the steps of obtaining at least (i) a database schema associated with a database and (ii) a query workload associated with the database; and generating, based at least in part on the database schema and the query workload, a distributed database structure for the database that (i) stores a first set of columns of the database within a private cloud environment in a plaintext format and (ii) stores a second set of columns of the database in a public cloud environment, wherein the second set of columns is stored in either a plaintext format or an encrypted format based on whether the second set of columns comprises sensitive data.

Another exemplary computer-implemented method includes obtaining a set of inputs comprising: (i) a database schema associated with a database, (ii) a query workload associated with the database, (iii) an indication that one or more columns in the database comprise sensitive data, and (iv) one or more system constraints of a private cloud; generating, based on the set of inputs, a distributed database structure for the database that (i) stores a first set of columns of the database within a private cloud in a plaintext format, and (ii) stores a second set of columns of the database in a public cloud in an encrypted format, wherein each column in the second set comprises sensitive data; and (iii) stores a third set of columns of the database in the public cloud in a plaintext format, wherein each column in the third set comprises data that are not sensitive; and obtaining one or more queries corresponding to said database; and dynamically updating the distributed database structure based on said one or more queries.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The term "database schema" is used herein to refer to the organization of data that defines how to construct a database.

Enterprises are more frequently sending their databases to cloud service providers. This leads to various benefits such as, for example, allowing pay-as-you-go models, not having to buy and manage hardware, increased reliability and scalability, etc. However, this can introduce various data security issues as well. For example, enterprise data are often stored in clear text (also referred to as plain text) at a public domain (e.g., a public cloud). Although the data can be encrypted on the disk, it needs to be decrypted when in memory. Since this encryption/decryption is done by the cloud server, the data are at risk since the cloud knows the keys. Additionally, a rogue administrator may snoop on clear text data such as by performing a memory dump when the data are being accessed.

Various solutions have been proposed to address the technical problem of implementing a secure database system in a distributed model. For example, one solution includes using partial homomorphic encryption schemes for encrypting data before uploading it to the cloud. A partial homomorphic encryption scheme allows computation of certain operations directly on encrypted data without a need for decrypting them, for example, deterministic encryption (supports equality predicates), order preserving encryption (supports range predicates), etc. A query that contains only those predicates which can be supported by partial homomorphic encryption can be fully executed at the cloud server after an appropriate query transformation. However, if a predicate of the query is not supported by the partial homomorphic encryption, then a fallback mechanism is used to execute the query. For example, the predicate col1*col2>col3 cannot be supported at a cloud server alone using a partial homomorphic encryption scheme. Rather, this predicate requires a fallback mechanism that involves the client to participate in the query processing. A non-limiting example of a fallback mechanism includes transferring data from the cloud server to the client, decrypting the data at the client, and then executing the query at the client. Those skilled in the art will appreciate that different fallback mechanisms may be used.

In a distributed database, the data are partitioned and stored across various independent database servers. This helps in improving the query processing, reliability, availability, and scalability of the database. The data can be partitioned either horizontally (different database servers store different rows of data) or vertically (different database servers store different columns of data).

A hybrid cloud includes multiple clouds including one or more public clouds and one or more private clouds. A private cloud is a trusted cloud, which is usually hosted by the client himself. A client has full trust on the public cloud. On the other hand, a public cloud is a general cloud managed by third party cloud service providers. A client has limited trust in the public cloud. The hybrid cloud is also proposed as a solution for implementing a secure database system in a distributed model. In this solution the data are distributed between public and private clouds. The distribution of the data are based on sensitivity of the data. In particular, data which are considered as sensitive are kept at the private cloud and other data can be kept at the public cloud. Query processing in such hybrid systems takes place in a distributed manner ensuring that sensitive data never leave the private cloud. Hence, such approaches cannot fully leverage the benefits if distributed database systems.

The exemplary embodiments herein describe improved techniques for generating a data partitioning strategy for secure and efficient query processing. The techniques described herein improve upon the hybrid cloud solution for implementing a secure database system in a distributed model. For example, one or more exemplary embodiments provide increased flexibility as sensitive data may be kept at either a private cloud, or at a public cloud, in which case the data are appropriately encrypted such as, for example, by using a semantically secure encryption scheme. Additionally, non-sensitive data may be kept at the private cloud in order to improve query processing times. According to some exemplary embodiments, a data partition plan may be determined based on a database schema and query workload, wherein the data partition plan details which columns of the database will be kept in a private cloud and which columns of the database will be kept in a public cloud (either in plain text or encrypted, appropriately).

At least one example embodiment allows sensitive columns stored in the public cloud to be encrypted using a partial homomorphic encryption scheme, which allows various predicates to be supported on these columns directly over the encrypted data at the public cloud. If the predicate cannot be supported over the encrypted data, then a fallback mechanism is used to execute the query.

Figure 1:
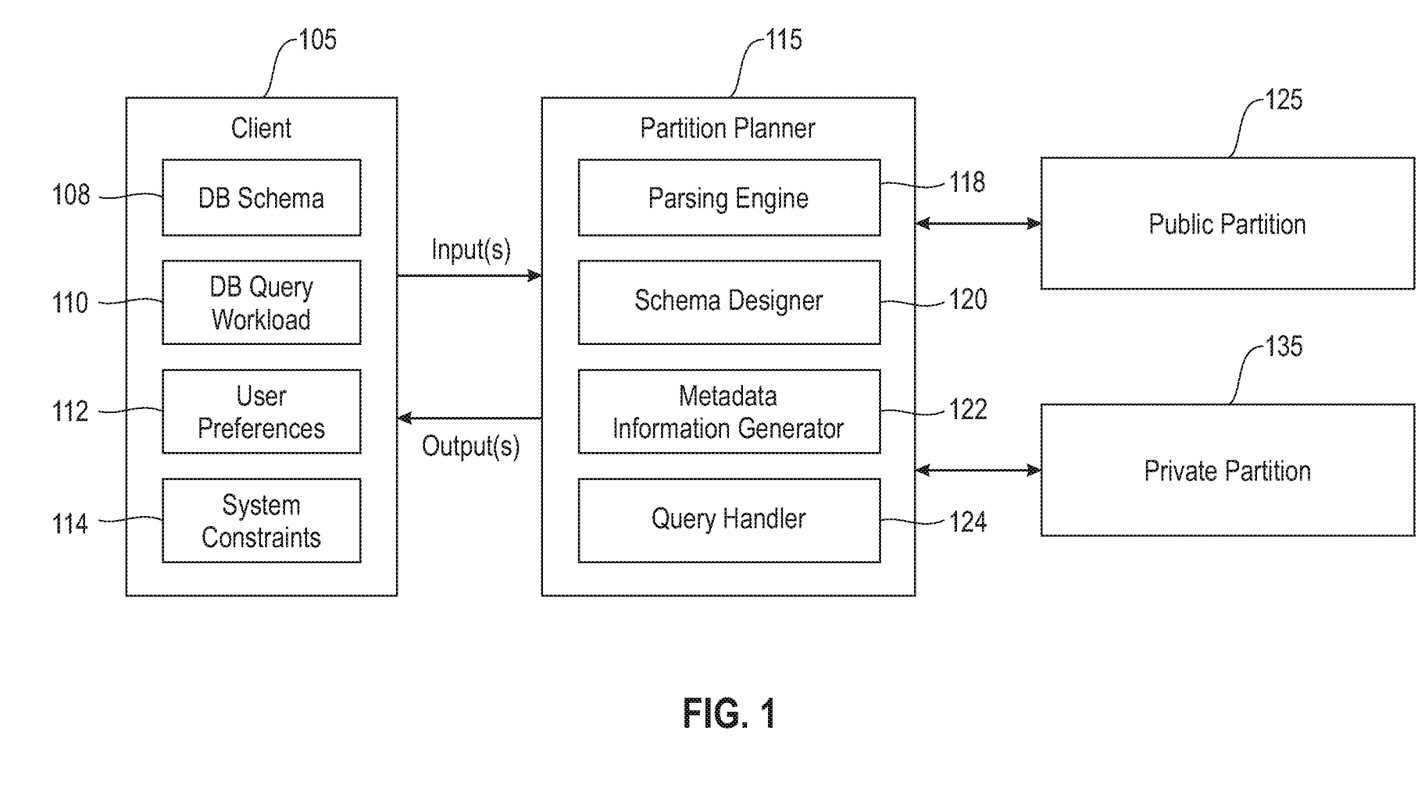
FIG. 1 is a diagram illustrating a system architecture in accordance with an exemplary embodiment.

Referring to FIG. 1, this figure depicts a system architecture in accordance with an exemplary embodiment. The system architecture includes a client 105, a partition planner 115, a public partition (or a public cloud) 125, and a private partition (or a private cloud) 135. In this example, the client 105 provides input to the partition planner 115. The input includes, for example, a database (DB) schema 108, a DB query workload 110, user preferences 112, and system constraints 114. The database schema 108 may be a file (such as, for example, a data definition language (DDL) file) that defines the create statements of a database. In at least one exemplary embodiment, the database schema 108 is read automatically from the database catalog.

The DB query workload 110 may include a plurality of SQL files, wherein each of the files defines a separate SQL statement corresponding to the database. In some examples, each of these files are then stored in a compressed folder (e.g., a zip folder). The query workload 108 may also be automatically determined by monitoring the database over a period of time. Also, in some example embodiments, a database server may maintain a history of queries executed, and this history is read automatically to determine the query workload 108.

The user preferences 112 may include one or more of: query weights, encryption scheme weights, and an indication of which columns should be treated as sensitive. The query weights are associated with each query. If there is no weight for a given query, then a uniform weight is assumed. The systems constraints 114 may include hardware constraints associated with the private partition 135 (e.g., memory, storage, and/or processing constraints). Additionally, the system constraints 114 may include budgetary constraints such as, for example, a maximum budget for costs associated with the public partition 125.

The partition planner 115 includes a parsing engine 118, a schema designer 120, metadata information generator 122, and a query handler 124.

The parsing engine 118 obtains inputs from the client 105 (e.g., DB schema 108 and DB query workload 110) and prepares inputs for the schema designer 120. Preparing these inputs may include performing a dependency analysis on the columns of the database to group the columns into groups, which are to be encrypted with the same encryption scheme with the same key. This grouping is based on (i) the DB query workload 110 (for example, two columns in the same group have one or more operations involving both of the columns), and (ii) the DB schema 108 (for example, columns in the same group are part of referential integrity constraint). The schema designer 120 then uses the DB schema 108, query workload 110, dependency analysis output, user preferences 112, and the system constraints 114 to design the data partitioning plan. The data partitioning plan includes, for example, a first set of columns that are to be kept in the private partition 135 in plain text and a second set of columns to be kept in the public partition 125 (either in plain text or after appropriate encryption). In this example, the distributed database architecture is provided as output from the partition planner 115 to client 105. The output of partition planner 115 may also include, for example, the encryption scheme to be used for particular columns and their associated keys.

The partition planner 115 also includes a metadata information generator 122. The metadata information generator 122 generates and stores metadata information associated with the distributed database architecture such as, for example, the columns of the database that are to be stored in the public partition 125 and the columns of the database that are to be stored in the private partition 135. The metadata information may include mapping information of the plaintext database schema against the encrypted database schema. For example, the mapping information may include one or more of: (i) a mapping between the encrypted table names and plain text table names, (ii) a mapping between encrypted columns and plain text columns, and (iii) information about the encryption schemes used for particular columns (e.g., advanced encryption standard (AES) (deterministic or randomized), order-preserving symmetric encryption (OPE), and plaintext). This information also includes the associated key label (or encryption keys). Additionally, the metadata information may include mapping information associated with a key label to actual encryption keys to be used. According to one embodiment, this mapping is replaced by calls to a third party encryption key manager such as an ICSF (Integrated Cryptographic Service Facility), for example.

The query handler 124 carries out query execution in accordance with the distributed database structure. For example, a database query provided as input from the client 105 may be used by the query handler 124 to generate a distributed database query to be executed over at least one of the public partition 125 and the private partition 135. The query execution process of query handler 124 is discussed in more detail below in conjunction with FIG. 3, for example. The results of the query may then be output to client 105.

Figure 2:
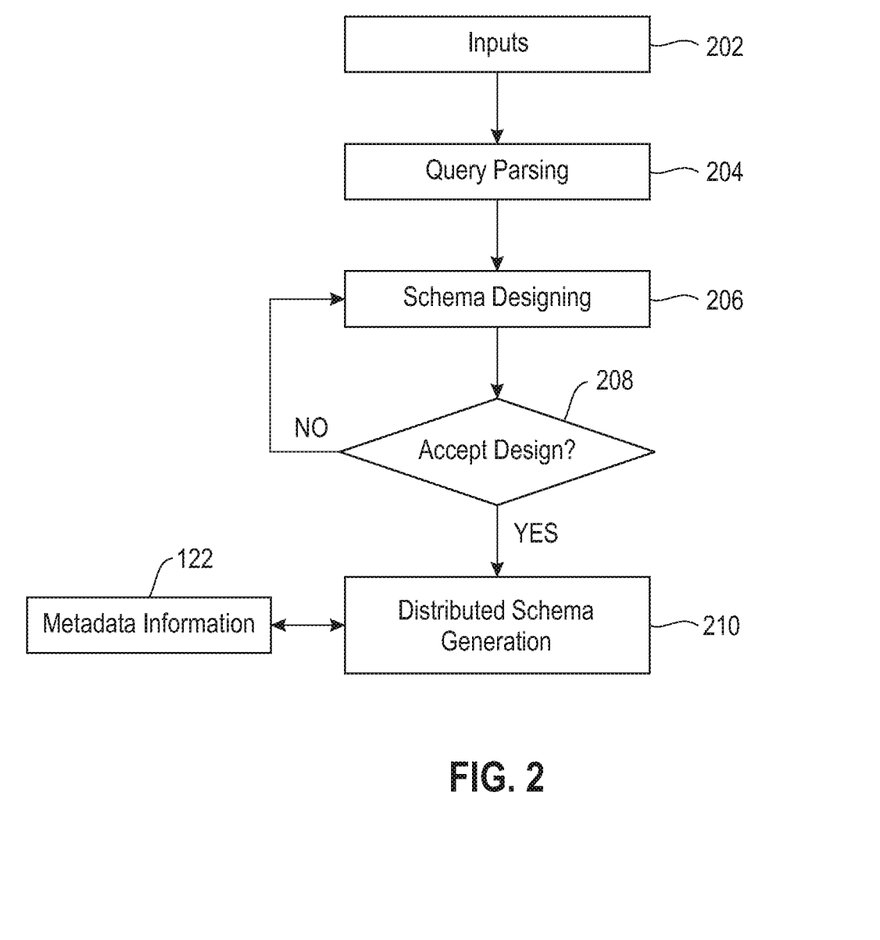
FIG. 2 is a diagram illustrating a schema design process in accordance with an exemplary embodiment.

Referring now to FIG. 2, this figure shows a diagram illustrating a schema design process in accordance with an exemplary embodiment. In this example, the process obtains inputs 202 that include, for example, DB schema 108, DB query workload 110, user preferences 112, and system constraints 114. At step 204, the queries in the DB query workload 110 are parsed. At step 206, a candidate distributed database structure is designed, which includes information about partitioning of database columns across public and private clouds. Additionally, for columns to be kept in the public cloud, the information indicates whether such columns will be stored in plain text format or in an encrypted format resulting from an appropriate encryption scheme. All information necessary to perform the encryption may also be provided as output. The candidate database structure satisfies user preferences 112 and/or the system constraints 114.

At step 208, a user (for example, client 105) evaluates the output of the schema design and provides feedback. If the user does not accept the design at step 208, then process flow returns to step 206, wherein a new candidate design is generated based on any further input provided by the user. If the design is accepted at step 208, then process flow continues to step 210, wherein the distributed schema is generated. For example, step 210 may include generating an output DDL statement corresponding to the accepted distributed schema database structure design, and generating the associated metadata information 122.

In some example embodiments, when a user does not accept the design at step 208, a schema redesign process is performed. This process involves finding a new distributed database structure based on the initial inputs and user feedback. To expedite this redesigning, a complex predicate threshold map is maintained that stores the mapping information between the predicate columns and their execution scores. An execution score is a metric that defines the relative importance of the predicate columns. As a non-limiting example, the execution score may be equal to a product of the query execution time and the query frequency call. According to one example embodiment, only those predicate columns which have an execution score greater than a predefined threshold are considered during the schema redesign process.

It is noted that a single database column may be part of multiple predicate columns. By way of example, suppose a given column ('C') is part of a particular predicate column ('P1'), whose participating columns are chosen to be in the private cloud (and hence kept in plain text). Assume column C is also part of another predicate column ('P2'), whose other columns are chosen to be kept in public cloud (either in plain text or in an encryption scheme which supports the predicate over encrypted data). In this scenario any one of the following options may be chosen:

a) All columns of P1 including C are kept in private cloud in plain text. All columns of P2 except C are kept in public cloud in an appropriate encryption scheme. In this scenario, a fallback mechanism is needed for executing P2.
  b) All columns of P1 including C are kept in private cloud in plain text. All columns of P2 are also brought in private cloud (if the system constraint is not breached) in plain text. In this scenario, both P1 and P2 are executed without fallback but it requires extra resources at private cloud.
  c) All columns of P1 including C are kept in private cloud in plain text. All columns of P2 except C are kept in public cloud in appropriate encryption scheme. The column C is kept in duplicate at public cloud (in appropriate encryption scheme) as well. Both copies of C are kept in sync with each other. In this scenario, both P1 and P2 are executed without fallback but it requires extra resources at the public cloud.

The option to be chosen depends on user input, such as, a user preference for example.

Figure 3:
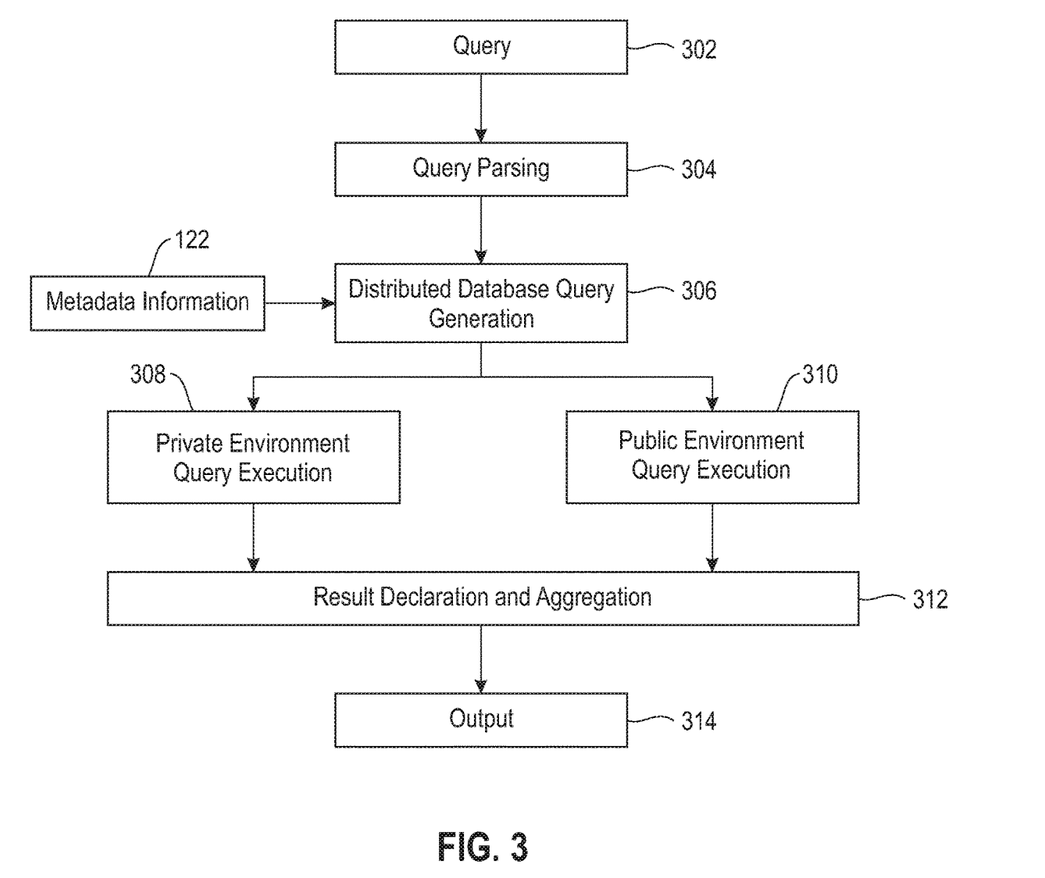
FIG. 3 is a diagram illustrating a query execution process in accordance with an exemplary embodiment.

Referring now to FIG. 3, this diagram shows a query execution process in accordance with an exemplary embodiment. In this example, a query 302 is provided as input to the process. The query 302 is parsed at step 304 to generate a distributed database query at step 306. For example, step 304 may include performing syntactic and semantic parsing, and validating the query 302. Step 306 includes generating a distributed query plan for the query 302 based on the metadata information 122. For any part of the query 302 that relates to the public partition, the query plan preparation is based on the encryption information from the metadata information 122 so that the proper encryption and decryption is used for the query and the result set transformation, respectively. The query plan is then performed by executing the part of the query associated with the private environment at step 308 and part of the query associated with the public environment at step 310. Step 312 includes declaring and aggregating the results of steps 308, 310. In at least one example, a storage buffer of the private environment is used to perform the data aggregation from both the private and public partitions. Additionally, a fallback mechanism may be chosen for processing queries having complex operators over columns in public partition. The process then outputs the result of the query 302 as represented by block 314.

In at least one exemplary embodiment, data deduplication is performed on the column data in one or more of the public and private domains. In general, data deduplication results in savings in storage space (hence savings in storage cost), and is also application-agnostic. In a data deduplication process, not all data are transformed to deduplication blocks, rather the amount data transformed depends on the deduplication rate (i.e., the aggregate reduction in storage requirements gained from deduplication technology). A higher deduplication ratio results in more data residing in the deduplication blocks. These improvements in storage cost come at the cost of extra processing resources during data deduplication and also during data access. This can lead to degradation of data access performance. Thus, data belonging to table columns that are not involved (or less involved) in the migration between the public and private domains are more suitable candidates for deduplication processing. If we use the column data involved in the migration for data deduplication, then every time the data need to move from one cloud to the other, the data need to be restored before moving to the other cloud. As such, one or more example embodiments prioritize those columns of database for deduplication which are less likely to be migrated either from public partition to private partition or vice versa.

According to at least one embodiment, columns of the database that comprise strings may be prioritized for storage in private cloud environment over columns of the database that comprise integers. The reason behind this is that encrypted strings support a very limited set of operations while encrypted integers support a wide variety of operations.

As a non-limiting example, consider a database schema that includes a first table, T1, with columns A1, A2, A3, A4, A5; and a second table, T2, with columns B1, B2, B3, B4, B5. Assume that the inputs provided by a user (e.g., client 105) indicate the following:

private partition includes space for four columns;
A1, A2, B1, B2 are sensitive columns;
A3, A4, A5, B3, B4, B5 are not sensitive columns; and
the query workload includes the following queries:
  Q1: Select A1,B3 from T1,T2 where A1+B3>100
  Q2: Select A2,B4 from T1,T2 where A2+B4>250
  Q3: Select B1,A3 from T1,T2 where B1+A3>400
  Q4: Select B2,A4 from T1,T2 where B2+A4>500

Additionally, let the weights of the queries be W1, W2, W3, and W4, respectively. Existing techniques generally keep the sensitive columns in the private cloud and the remaining columns in the public cloud. So, in this example, columns A1, A2, B1, B2 would be kept in the private cloud in plain text, and columns A3, A4, A5, B3, B4, B5 would be kept in the public cloud in plain text. Thus, for each of the queries Q1, Q2, Q3, Q4, one column must be brought from the public cloud to the private cloud. The column can either be stored temporarily at the private cloud (for the duration of query processing) or used in a streaming manner.

In accordance with one or more example embodiments, for the case when W1>W3>W2>W4, a distributed database schema can be generated such that columns A1, A3, B1, B3 are kept in the private cloud in plain text; columns A2 and B2 are kept in the public cloud under a semantically secure encryption scheme; and columns A4, A5, B4, B5 are in public cloud, which can remain in in plain text. In this scenario, Q1 and Q3 will be fully executed at the private cloud; and Q2 and Q4 will be executed using a fallback mechanism, such as by transferring data between private and public cloud (potentially in a streaming mode). It is noted that in this case, the sum of weights for queries which can be executed at private cloud (i.e., Q1 and Q3) is more than more than the sum of weights for queries which require fallback mechanism (i.e., Q2 and Q4).

Now, suppose at some later time, the following query is provided:
  Q5: Select A2, B5 from T1, T2 where A2+B5>1100, wherein Q5 has a query weight W5 such that W5>W1>W3>W2>W4.

In accordance with exemplary embodiments, the partitioning strategy above can be dynamically updated such that:
  Keep A1 and B3 in the private cloud in plain text;
  Bring A2 and B5 from the public cloud to the private cloud and leave them in plain text;
  Transfer A3 and B1 from the private cloud to the public cloud (B1 is encrypted using semantically secure encryption scheme);
  Keep B2 in the public cloud under a semantically secure encryption scheme; and
  Keep A4, A5, B4, B5 in the public cloud (e.g., in plain text).

Finally, assume that the following query is also provided:
  Q6: select B1, A5 from T1, T2 where B1=A5, wherein the weight of Q6 is W6 such that W6>W5>W1>W3>W2>W4.

Further assume that additional user input allows deterministic encryption for columns B1 and A5. In this situation, Q6 can be fully executed at the public cloud so long as B1 and A5 are encrypted under the same deterministic encryption scheme. Thus, the optimal partitioning strategy is as follows:
  Keep A1, A2, B3, B5 in private cloud in plain text;
  Keep B1, A5 in public cloud in deterministic encryption scheme with same key;
  Keep B2 in public cloud under semantically secure encryption scheme; and
  Keep A3, A4, B4 in public cloud (can be in plain text).

Under this portioning strategy, Q1, Q5 and Q6 will execute without fallback mechanism.

Figure 4:
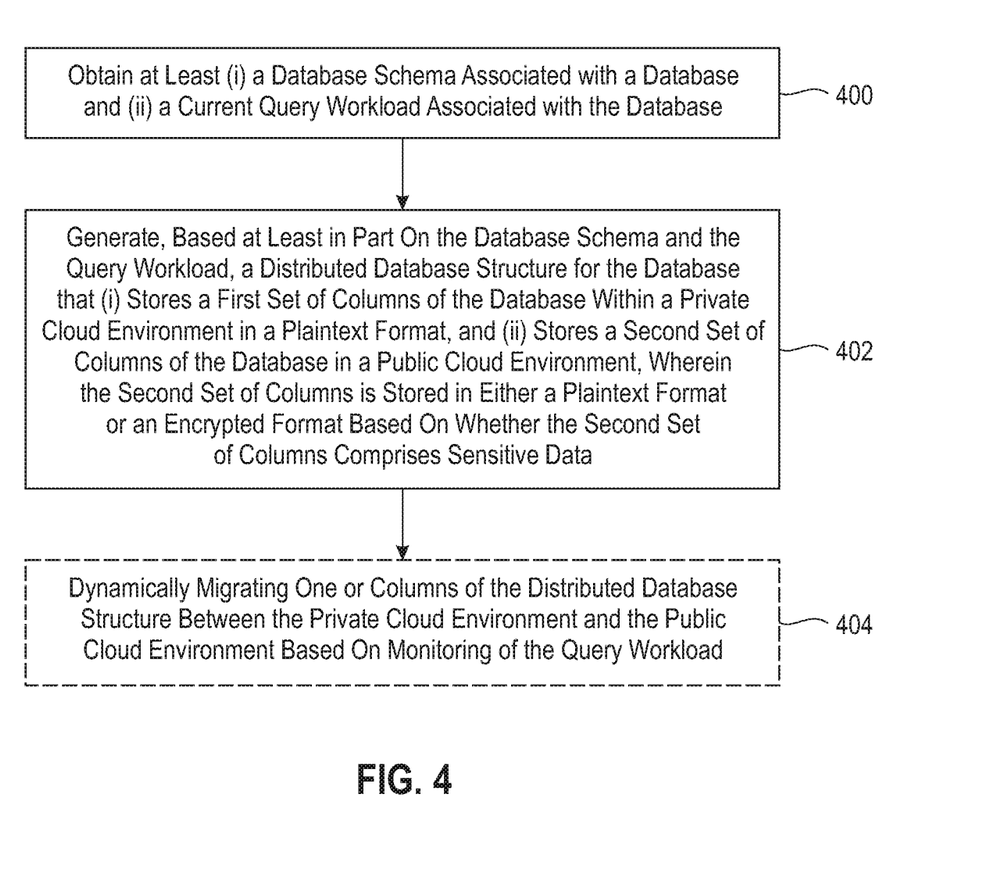
FIG. 4 is a flow diagram illustrating techniques according to an embodiment of the invention.

FIG. 4 is a flow diagram of a process illustrating techniques according to an embodiment of the present invention. Step 400 includes obtaining at least (i) a database schema associated with a database and (ii) a query workload associated with the database. Step 402 includes generating, based at least in part on the database schema and the query workload, a distributed database structure for the database that (i) stores a first set of columns of the database within a private cloud environment in a plaintext format and (ii) stores a second set of columns of the database in a public cloud environment, wherein the second set of columns is stored in either a plaintext format or an encrypted format based on whether the second set of columns comprises sensitive data. Optionally, step 404 includes dynamically migrating one or more columns of the distributed database structure between the private cloud environment and the public cloud environment based on said monitoring based on monitoring of the query workload.

Generating the distributed database architecture may be based on at least one system constraint corresponding to the private cloud environment, wherein the at least one system constraint comprises one or more of: (i) a memory constraint, (ii) a storage constraint, and (iii) a processing constraint. Generating the distributed database structure may be based on at least one user preference, the at least one user preference comprising one or more of: information indicating that one or more columns of the database are to be stored within the private cloud environment; and information indicating one or more preferred encryption schemes to be used to encrypt the second set of columns into the encrypted format. The process may include performing a deduplication process that prioritizes columns of the distributed database structure that are unlikely to be migrated from, at least one of, (i) the public cloud environment to the private cloud environment and (ii) the private cloud environment to the public cloud environment. One or more of the columns in the second set of columns may include sensitive data, wherein the sensitive data are stored within the public cloud environment in the encrypted format. The query workload may include at least one query, and generating the distributed database structure for the database may be based on a weight of a predicate column belonging to the at least one query. The weight may be based on (i) a query execution time of the at least one query and (ii) a call frequency of the at least one query. The process may include a step of processing one or more queries over the distributed system structure based at least in part on metadata information corresponding to the distributed database structure. The process may include a step of maintaining the metadata information, wherein the metadata information comprise one or more of: (i) information indicative of the columns stored within the private storage environment, (ii) information indicative of the columns stored within the public storage environment, and (iii) information corresponding to one or more encryption schemes applied to one or more of the columns that are stored in the public storage environment in an encrypted format. The processing may include determining at least one of the queries comprises a complex operator involving one or more of the columns stored in the public cloud environment, and processing the at least one of the queries using a fallback mechanism. The generating may include prioritizing storing columns of the database that comprise strings in the private cloud environment over columns of the database that comprise integers.

In another example embodiment, a computer-implemented method includes obtaining a set of inputs comprising: (i) a database schema associated with a database, (ii) a query workload associated with the database, (iii) an indication that one or more columns in the database comprise sensitive data, and (iv) one or more system constraints of a private cloud; generating, based on the set of inputs, a distributed database structure for the database that (i) stores a first set of columns of the database within a private cloud in a plaintext format (ii) stores a second set of columns of the database in a public cloud in an encrypted format, wherein each column in the second set comprises sensitive data, and (iii) stores a third set of columns of the database in the public cloud in a plaintext format, wherein each column in the third set comprises data that are not sensitive; obtaining one or more queries corresponding to said database; and dynamically updating the distributed database structure based on said one or more queries.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
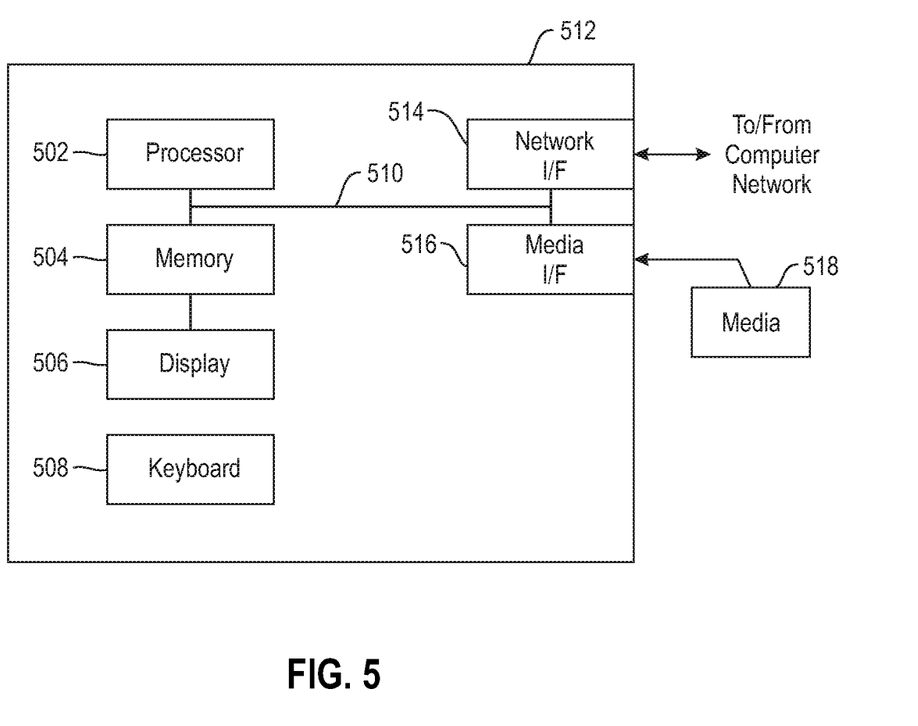
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
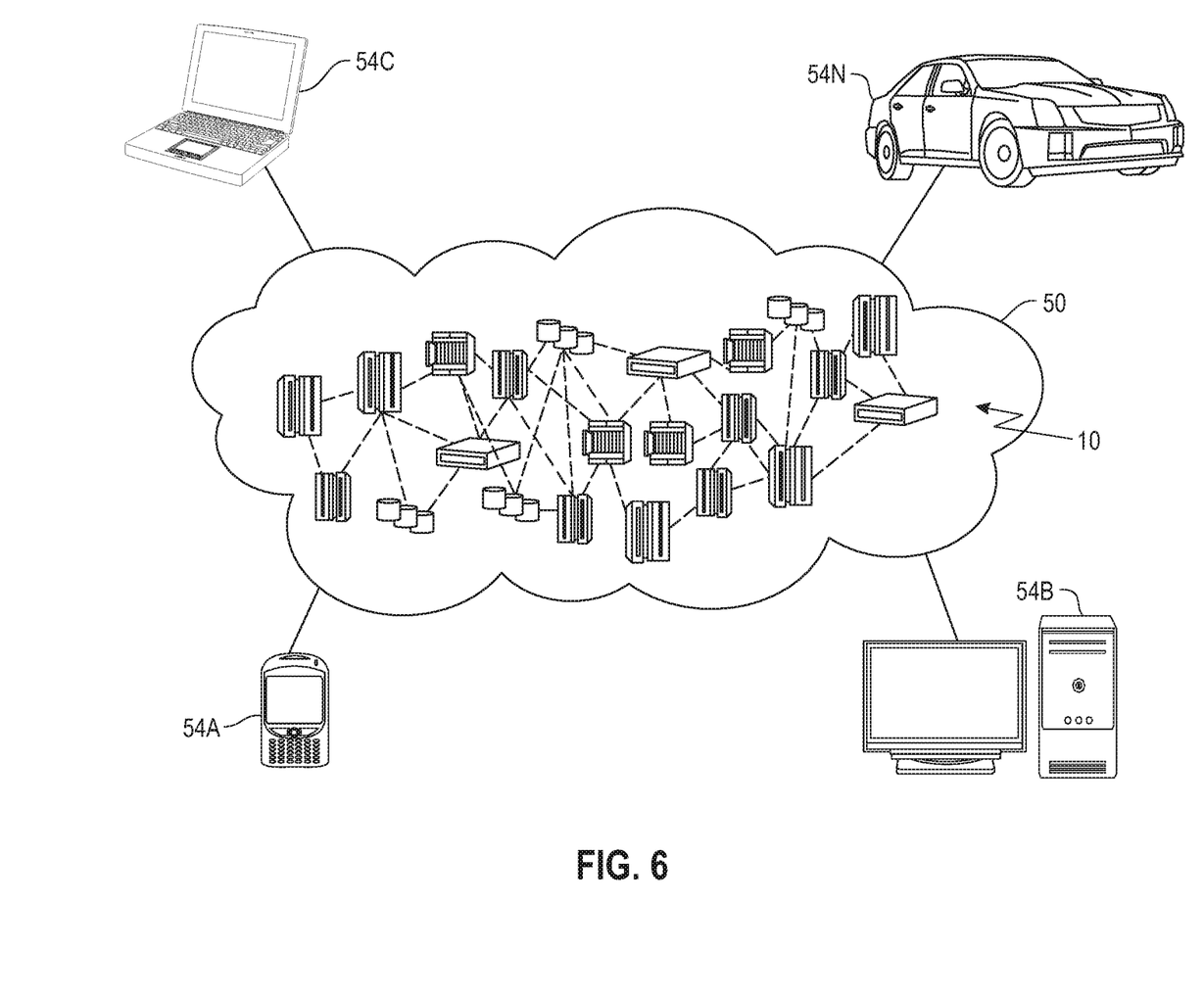
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
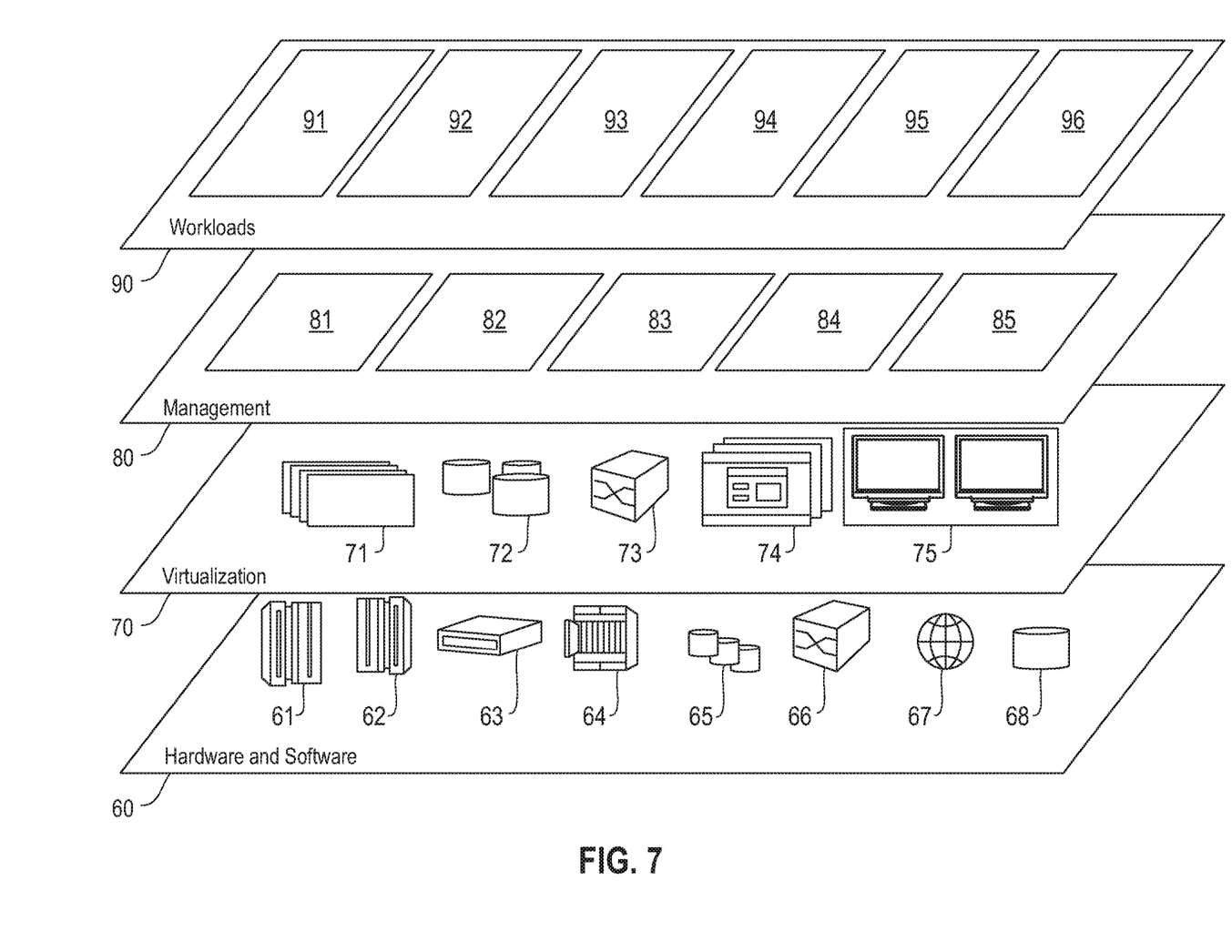
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for generating a data partitioning strategy 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

Without in any way limiting the scope, interpretation, or application of the claims appearing below, a beneficial effect of one or more of the example embodiments disclosed herein is improved query performance while maintaining security. Another technical effect of one or more of the example embodiments disclosed herein is selecting the optimal column partition strategy to achieve one or more of: increased or maximum desired workload, no data leakage, least amount work performed in private cloud, and increased or maximum utilization of public cloud utilization.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
   obtaining at least (i) a database schema associated with a database and (ii) a query workload associated with the database; and
   generating, based at least in part on the database schema and the query workload, a distributed database structure for the database that (i) stores a first set of columns of the database within a private cloud environment in a plaintext format and (ii) stores a second set of columns of the database in a public cloud environment, wherein the second set of columns is stored in either a plaintext format or an encrypted format based on whether the second set of columns comprises sensitive data;
   wherein the method is carried out by at least one computing device.

2. The computer-implemented method of claim 1, wherein said generating the distributed database structure is based on at least one system constraint corresponding to the private cloud environment, wherein the at least one system constraint comprises one or more of: (i) a memory constraint, (ii) a storage constraint, and (iii) a processing constraint.

3. The computer-implemented method of claim 1, wherein said generating the distributed database structure is based on at least one user preference, the at least one user preference comprising one or more of:
   information indicating that one or more columns of the database are to be stored within the private cloud environment; and
   information indicating one or more preferred encryption schemes to be used to encrypt the second set of columns into the encrypted format.

4. The computer-implemented method of claim 1, comprising:
   monitoring the query workload of the database; and
   dynamically migrating one or more columns of the distributed database structure between the private cloud environment and the public cloud environment based on said monitoring.

5. The computer-implemented method of claim 4, comprising:
performing a deduplication process that prioritizes columns of the distributed database structure that are unlikely to be migrated from, at least one of, (i) the public cloud environment to the private cloud environment and (ii) the private cloud environment to the public cloud environment.

6. The computer-implemented method of claim 1, wherein one or more of the columns in the second set of columns comprise sensitive data, and wherein the sensitive data are stored within the public cloud environment in the encrypted format.

7. The computer-implemented method of claim 1, wherein the query workload comprises at least one query, and wherein generating the distributed database structure for the database is based on a weight of a predicate column belonging to the at least one query, wherein the weight is based on (i) a query execution time of the at least one query and (ii) a call frequency of the at least one query.

8. The computer-implemented method of claim 1, comprising:
processing one or more queries over the distributed system structure based at least in part on metadata information corresponding to the distributed database structure.

9. The computer-implemented method of claim 8, comprising:
maintaining the metadata information, wherein the metadata information comprises one or more of: (i) information indicative of the columns stored within the private storage environment, (ii) information indicative of the columns stored within the public storage environment, and (iii) information corresponding to one or more encryption schemes applied to one or more of the columns that are stored in the public storage environment in an encrypted format.

10. The computer-implemented method of claim 8, wherein said processing comprises:
determining at least one of the queries comprises a complex operator involving one or more of the columns stored in the public cloud environment, and
processing the at least one of the queries using a fallback mechanism.

11. The computer-implemented method of claim 1, wherein said generating comprises:
prioritizing storing columns of the database that comprise strings in the private cloud environment over columns of the database that comprise integers.

12. A computer program product comprising a computer readable storage medium having program instructions embodied therewith, the program instructions executable by a computing device to cause the computing device to:
obtain at least (i) a database schema associated with a database and (ii) a query workload associated with the database; and
generate, based at least in part on the database schema and the query workload, a distributed database structure for the database that (i) stores a first set of columns of the database within a private cloud environment in a plaintext format and (ii) stores a second set of columns of the database in a public cloud environment, wherein the second set of columns is stored in either a plaintext format or an encrypted format based on whether the second set of columns comprises sensitive data.

13. The computer program product of claim 12, wherein said generating the distributed database structure is based on at least one system constraint corresponding to the private cloud environment, wherein the at least one system constraint comprises one or more of: (i) a memory constraint, (ii) a storage constraint, and (iii) a processing constraint.

14. The computer program product of claim 12, wherein said generating the distributed database structure is based on at least one user preference, the at least one user preference comprising one or more of:
information indicating that one or more columns of the database are to be stored within the private cloud environment; and
information indicating one or more preferred encryption schemes to be used to encrypt the second set of columns into the encrypted format.

15. The computer program product of claim 12, wherein the program instructions cause the computing device to:
monitor the query workload of the database; and
dynamically migrate one or more columns of the distributed database structure between the private cloud environment and the public cloud environment based on said monitoring.

16. The computer program product of claim 15, wherein the program instructions cause the computing device to:
performing a deduplication process that prioritizes columns of the distributed database structure that are unlikely to be migrated from, at least one of, (i) the public cloud environment to the private cloud environment and (ii) the private cloud environment to the public cloud environment.

17. The computer program product of claim 12, wherein one or more of the columns in the second set of columns comprise sensitive data, and wherein the sensitive data are stored within the public cloud environment in the encrypted format.

18. The computer program product of claim 12, wherein the query workload comprises at least one query, and wherein generating the distributed database structure for the database is based on a weight of a predicate column belonging to the at least one query, wherein the weight is based on (i) a query execution time of the at least one query and (ii) a call frequency of the at least one query.

19. A system comprising:
a memory; and
at least one processor operably coupled to the memory and configured for:
obtaining at least (i) a database schema associated with a database and (ii) a query workload associated with the database; and
generating, based at least in part on the database schema and the query workload, a distributed database structure for the database that (i) stores a first set of columns of the database within a private cloud environment in a plaintext format and (ii) stores a second set of columns of the database in a public cloud environment, wherein the second set of columns is stored in either a plaintext format or an encrypted format based on whether the second set of columns comprises sensitive data.

20. A computer-implemented method, the method comprising:
obtaining a set of inputs comprising: (i) a database schema associated with a database, (ii) a query workload associated with the database, (iii) an indication that one or more columns in the database comprise sensitive data, and (iv) one or more system constraints of a private cloud;

generating, based on the set of inputs, a distributed database structure for the database that (i) stores a first set of columns of the database within a private cloud in a plaintext format, (ii) stores a second set of columns of the database in a public cloud in an encrypted format, wherein each column in the second set comprises sensitive data, and (iii) stores a third set of columns of the database in the public cloud in a plaintext format, wherein each column in the third set comprises data that are not sensitive;

obtaining one or more queries corresponding to said database; and dynamically updating the distributed database structure based on said one or more queries;

wherein the method is carried out by at least one computing device.

\* \* \* \* \*